(12) United States Patent
Williams et al.

(10) Patent No.: US 9,014,174 B2
(45) Date of Patent: Apr. 21, 2015

(54) MANAGING MULTIPLE FORWARDING INFORMATION BASES

(71) Applicants: Research in Motion Limited, Waterloo (CA); QNX Software Systems Limited, Kanata (CA)

(72) Inventors: Kerry Gordon Peter Williams, Ottawa (CA); Nils Patrik Lahti, Ottawa (CA); Chi Chiu Tse, Markham (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 208 days.

(21) Appl. No.: 13/628,677

(22) Filed: Sep. 27, 2012

(65) Prior Publication Data
US 2014/0003359 A1   Jan. 2, 2014

Related U.S. Application Data

(60) Provisional application No. 61/666,608, filed on Jun. 29, 2012.

(51) Int. Cl.
| H04L 12/28 | (2006.01) |
| H04L 12/741 | (2013.01) |
| H04W 12/02 | (2009.01) |
| H04W 12/08 | (2009.01) |
| H04W 88/06 | (2009.01) |

(52) U.S. Cl.
CPC .............. *H04L 45/54* (2013.01); *H04W 12/02* (2013.01); *H04W 12/08* (2013.01); *H04W 88/06* (2013.01)

(58) Field of Classification Search
None
See application file for complete search history.

(56) References Cited

U.S. PATENT DOCUMENTS

| 2007/0038764 | A1 | 2/2007 | Maillard | |
| 2007/0133548 | A1 | 6/2007 | Kim et al. | |
| 2009/0097492 | A1* | 4/2009 | Monette et al. | 370/401 |
| 2011/0075680 | A1* | 3/2011 | Sun et al. | 370/419 |
| 2011/0096777 | A1* | 4/2011 | Paul et al. | 370/389 |

(Continued)

FOREIGN PATENT DOCUMENTS

| EP | 2091190 | 8/2009 |
| WO | 03103309 | 12/2003 |
| WO | 2012014194 | 2/2012 |

OTHER PUBLICATIONS

European Search Report in EP Application No. 12186275.9; issued on May 8, 2013, 8 pages.

(Continued)

*Primary Examiner* — Ashley Shivers
(74) *Attorney, Agent, or Firm* — Fish & Richardson P.C.

(57) ABSTRACT

In some implementations, a method for routing a communication includes receiving, from an application running on a user equipment (UE), a request to access a forwarding information base (FIB). The UE includes a plurality of FIBs and a plurality of communication interfaces. Each of the plurality of FIBs includes communication interface information. An assigned FIB from the plurality of FIBs is determined. The assigned FIB has been assigned to the application. An appropriate communication interface for communication is determined based on a destination of the communication and the communication interface information of the assigned FIB. The communication is transmitted to the destination using the communication interface.

24 Claims, 13 Drawing Sheets

(56) References Cited

U.S. PATENT DOCUMENTS

2011/0122889 A1* 5/2011 Pacella et al. .................. 370/428
2012/0143939 A1   6/2012 Kang et al.

OTHER PUBLICATIONS

Office Action issued in Canadian Application No. 2,820,507 on Nov. 4, 2014; 3 pages.

* cited by examiner

```
# netstat -rn -finet
Routing tables

Internet:
Destination        Gateway            Flags   Refs    Use     Mtu     Interface
default            25.48.90.206       UG      13      66      -       msm0
25.48.90.204/30    link#6             UC      2       0       -       msm0
25.48.90.206       link#6             UHLc    1       0       -       msm0
25.48.90.207       link#6             UHLc    2       70      -       msm0
127.0.0.1          127.0.0.1          UH      0       161     33192   lo0
127.0.0.2          127.0.0.2          UH      0       0       33192   lo1
127.0.0.3          127.0.0.3          UH      0       0       33192   lo2
169.254.208.100/30 link#7             UC      2       0       -       ecm0
169.254.208.102    72:d4:f2:d1:15:ca  UHLc    4       42      -       ecm0
169.254.208.103    link#7             UHLc    2       21      -       ecm0
```

MANAGING MULTIPLE FORWARDING INFORMATION BASES

CLAIM OF PRIORITY

This application claims priority under 35 USC §119(e) to U.S. Patent Application Ser. No. 61/666,608, filed on Jun. 29, 2012, the entire contents of which are hereby incorporated by reference.

TECHNICAL FIELD

This invention relates to managing multiple forwarding information bases.

BACKGROUND

In many instances, computational devices may include data, applications, and/or network resources whose accessibility is controlled by security protocols. For example, the security protocols may include user accounts, administration rights, password protection, database management, and others. Resources associated with different enterprises and users may require different secured accessibility.

DESCRIPTION OF DRAWINGS

Like reference symbols in the various drawings indicate like elements.

DETAILED DESCRIPTION

Figure 1:
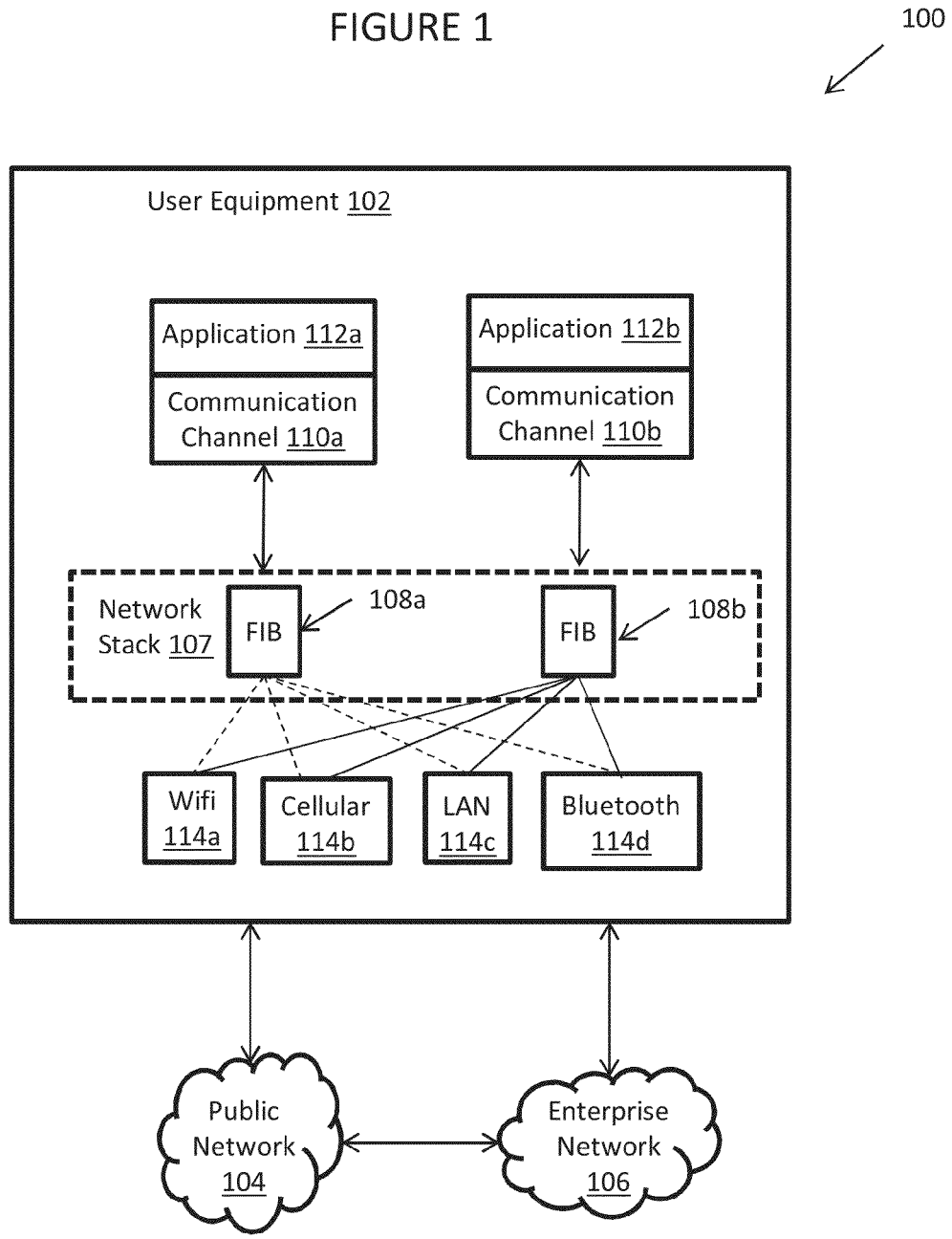
FIG. 1 is an example communication system using each of multiple forwarding information bases (MFIBs) for different applications.

In some implementations, a method for routing a communication includes receiving, from an application running on a user equipment (UE), a request to access a forwarding information base (FIB). The UE includes a plurality of FIBs and a plurality of communication interfaces. Each of the plurality of FIBs includes communication interface information. An assigned FIB is determined from the plurality of FIBs. The assigned FIB has been assigned to the application. An appropriate communication interface for communication is determined based on a destination of the communication and the communication interface information of the assigned FIB. The communication is transmitted to the destination using the communication interface.

Specific implementations can include one or more of the following features. When the assigned FIB comprises a first FIB, the first FIB is assigned to a first set of applications including the application, and a second FIB from the plurality of FIBs is assigned to a second set of applications, wherein the second FIB is different from the first FIB. When the application is a first application and the assigned FIB is a first FIB, a first default route is assigned to the first application using the first FIB, and a second default route is assigned to a second application using a second FIB from the plurality of FIBs, wherein the second default route is different from the first default route. A first perimeter includes the assigned FIB and is configured to prevent resources in a second perimeter from accessing one or more first network resources in the first perimeter, and a second perimeter includes a second FIB from the plurality of FIBs and is configured to prevent resources in the first perimeter from accessing one or more second network resources in the second perimeter. When the first perimeter and the second perimeter include shared interfaces, determining an interface includes both determining a first prioritized order for the shared interfaces in the first perimeter based on the first FIB, wherein a second prioritized order in the second FIB is different from the first prioritized order, and determining the interface from the shared interfaces based on the prioritized order and the destination. Determining an interface may include the following: determining a first prioritized order for network types in the first perimeter based on the first FIB; selecting a network type based on the first prioritized order for the network types; and determining the interface based on the destination and the selected network type. When the FIB includes a first FIB and the application includes a first application, determining an interface for the communication may include the following: determining the first FIB identifies a second FIB from the plurality of FIBs, wherein the second FIB is assigned to a second application; determining the interface based on the second FIB and the destination; and transmitting the communication through an encrypted tunnel using the interface identified in the second FIB. The first application includes an enterprise application, and the interface identified in the second FIB includes an interface to a public network. When the FIB includes a first FIB, a network stack may determine the application is assigned the first FIB and be configured to access at least the first FIB and a second FIB from the plurality of FIBs.

The present disclosure relates to routing communications using multiple forwarding information bases (MFIBs) in user equipment (UE). In some implementations, a forwarding information base (FIB) can be a data structure that associates destinations with communication interface information (e.g., physical interface), and MFIBs can be multiple forwarding information bases locally stored on a device. In some implementations, the UE may route communication based on one or more of the following: different FIBs assigned to different applications; prioritizing shared network resources differently in each security/trust domain or perimeter; prioritizing networks by type based on a policy decision made external to the device (e.g., user, corporation, other); or others.

Figure 2:
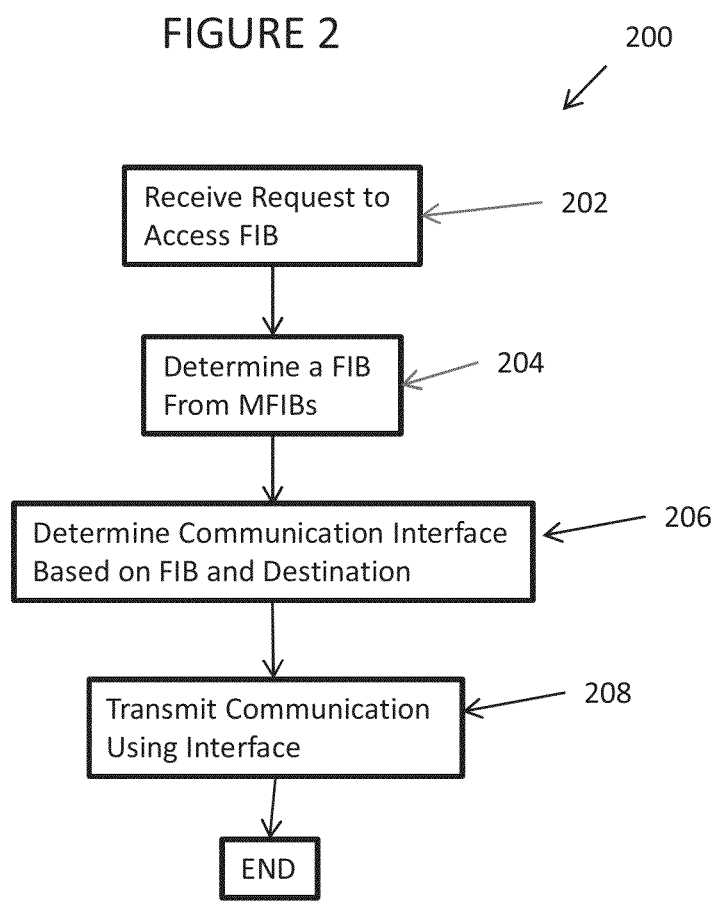
FIG. 2 is a flow chart illustrating an example method for using MFIBs.

In implementations in which different FIBs may be used for different applications, the UE may use a first FIB when routing communication for a first application and a second FIB when routing communication for a second application (discussed with respect to FIGS. 1 and 2). In some implementations, a UE may use MFIBs to determine UE interfaces for routing communication to external networks. For example, a first FIB may map or otherwise associate a destination address to a first interface, and a second FIB may map or otherwise associate the destination address to a second interface different from the first interface. In some implementations, an interface may include one or more public interfaces and one or more private interfaces (e.g., an enterprise interface). A public interface may include, for example, a personal virtual private network (VPN) interface, a wired interface, a mobile interface, a personal WiFi interface, a tether interface, a bridge interface, or others. A private (or enterprise) interface may include, for example, an enterprise VPN, an enterprise bridge interface, an enterprise WiFi interface, or others. As mentioned, in some implementations, a UE may include a first FIB assigned to a first application and a second FIB assigned to a second application. In these instances, the UE may route communication for the first application to interfaces identified by the first FIB and route communication for the second application to interfaces identified by the second FIB. By assigning different FIBs to different applications, the UE may isolate applications at the network stack to, for example, substantially prevent malicious applications from compromising other applications or other network resources. For example, the UE may isolate enterprise applications from untrusted applications like games or other programs obtained from untrusted locations.

Figure 4:
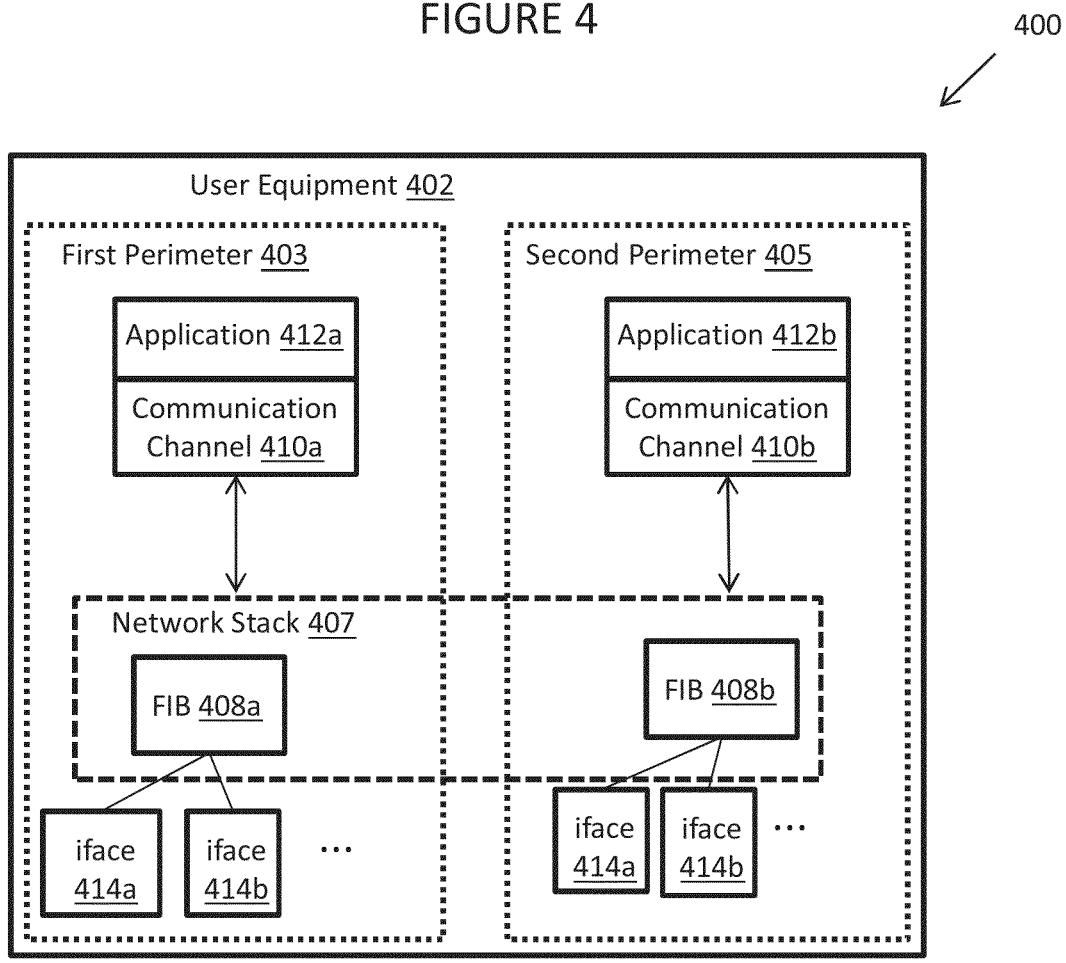
FIG. 4 is an example communication system for prioritizing shared interfaces.
Figure 5:
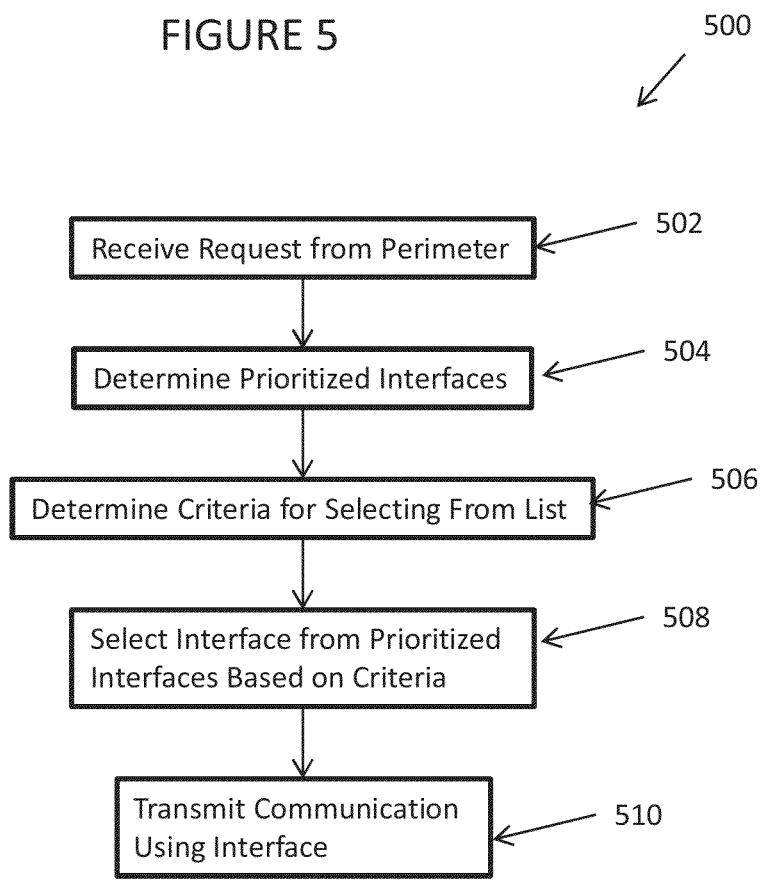
FIG. 5 is a flow chart illustrating an example method for selecting from prioritized shared interfaces.

In implementations employing shared interfaces, the MFIBs may be assigned to different perimeters of a UE and may be configured to prioritize shared network resources differently in each perimeter (discussed with regards to FIGS. 4 and 5). In general, a security/trusted domain or perimeter may refer to a logical separation of resources, such as applications, stored data and/or network access. In some implementations, resources included in a perimeter which are not shared may be encrypted and password protected to, for example, securely separate those resources from resources in different perimeters. For example, unshared resources in one perimeter may be prohibited from accessing unshared resources associated with a different perimeter. Shared network resources, on the other hand, may include resources such as interfaces shared by two or more perimeters. For example, a first perimeter and a second perimeter may share a WiFi interface, a Bluetooth interface, and others. In some implementations, a FIB assigned to a first perimeter may prioritize shared interfaces in a first order, and a FIB assigned to a second perimeter may prioritize the shared interfaces in a second order different from the first order. In some implementations, perimeters may include a first perimeter (e.g., a personal perimeter, a first user perimeter) and a second perimeter (e.g., security perimeter, a second user perimeter).

In a multi-user example, a first perimeter assigned to a first user may logically separate unshared resources from a second perimeter assigned to a second user and vice versa. In these examples, the FIB associated with the first user may prioritize resources such as interfaces in a first order, and the FIB associated with the second user may prioritize the same resources in a different order.

In a mobile environment, certain resources, such as interfaces may be less preferential than others due to a variety of reasons including actual monetary cost. Network selection in mobile or non-mobile environments may be based on network performance, but, in the mobile space, the end user may want to select a network based on other criteria. For example, a mobile user may want to use a slower link (e.g. WiFi) if a faster link is more expensive (e.g., cellular). In some instances, a cellular carrier may also want to switch traffic to slower links to alleviate network load for servers. To address these issues, the MFIBs can, in some implementations, include prioritized interface lists that operate policies to determine the order in which interfaces are selected. For example, a policy could include selecting the lowest cost alternative.

In implementations employing a personal perimeter and a security perimeter, the personal perimeter may generally refer to a perimeter created by default for a user and managed by the same or a different user through a wireless communication device. The security perimeter may generally refer to a perimeter created for or by a user and managed by a remote management server (e.g., a BlackBerry Enterprise Server (BES)). In these instances, the personal perimeter may provide permission to be accessed by personal applications, and the security perimeter, when unlocked by the user, may provide permission to be accessed by enterprise applications. Accordingly, the FIB in the personal perimeter may prioritize interfaces shared with the security perimeter in a first order, and the FIB in the security perimeter may prioritize the shared interfaces in a second order different from the first order.

Figure 6:
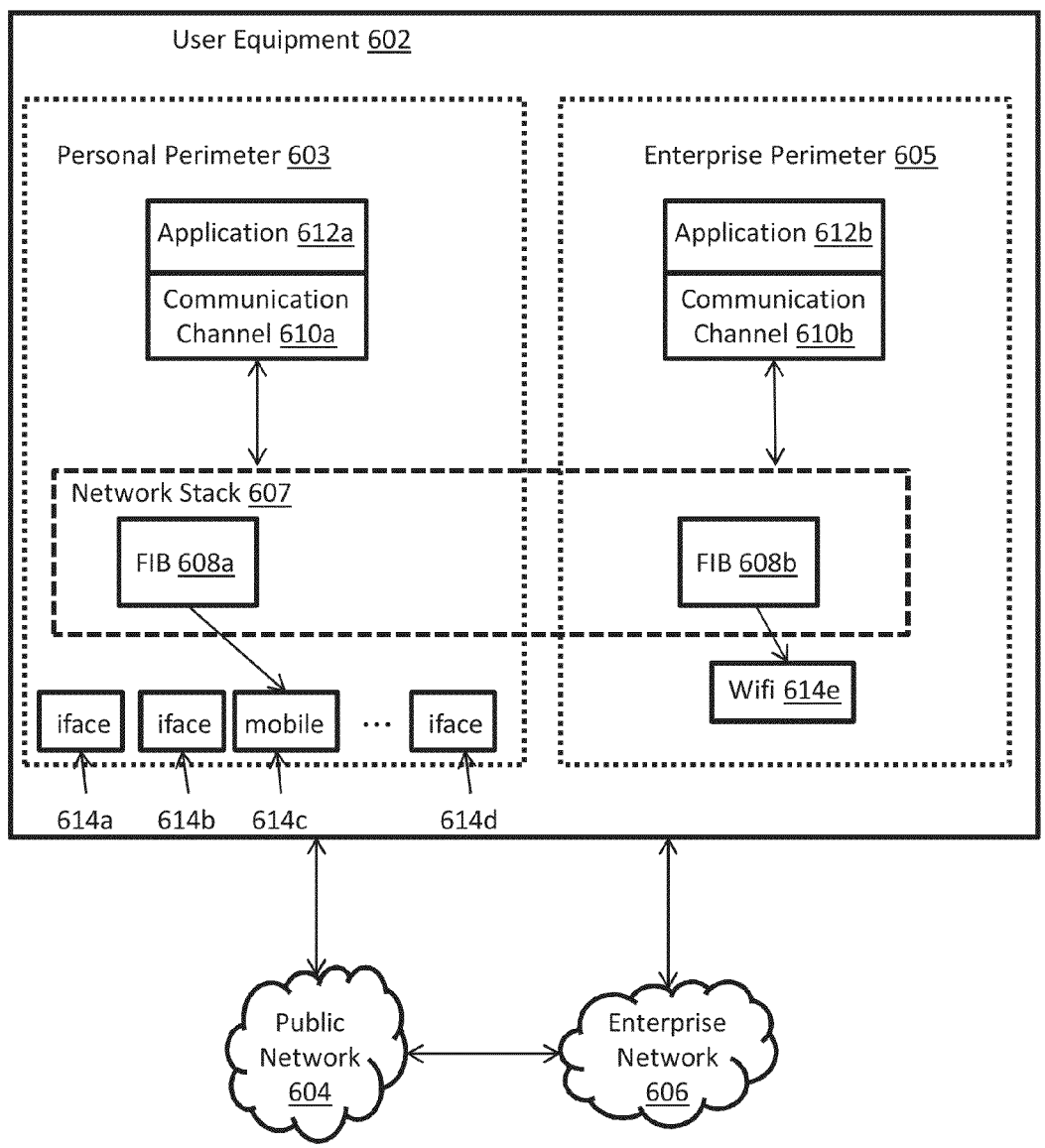
FIG. 6 is an example communication system for prioritizing network types.
Figure 7:
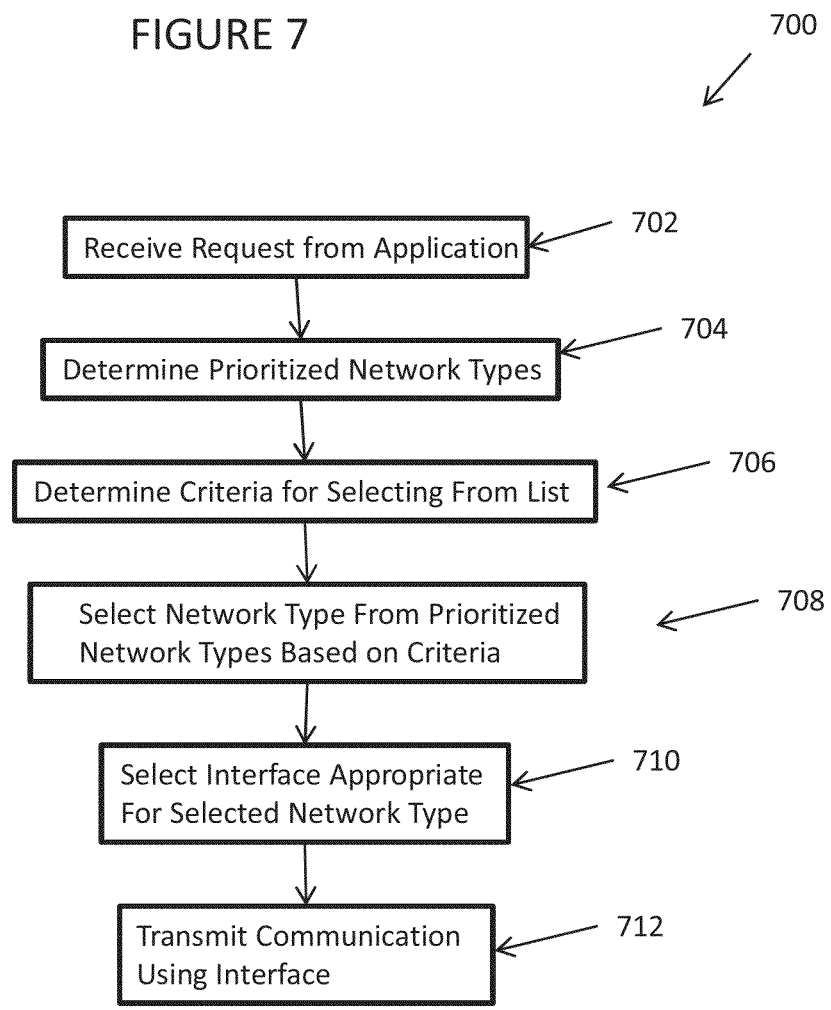
FIG. 7 is a flow chart illustrating an example method for selecting from prioritized network types.

In implementations in which network types may be prioritized, MFIBs in different perimeters may be configured to initially prioritize network types prior to determining an interface (see description with regards to FIGS. 6 and 7). For example, a FIB may include a prioritization order for network types such as wireless broadband network, cellular network, wireless local area network, or others. In these implementations, the UE may initially determine a network for communication based on the prioritized order of network types and determine an interface for the determined network. In some instances, a FIB assigned to a perimeter may include both the prioritized order of network types and interfaces for each type based on destinations.

In some implementations, by assigning a first FIB and a second FIB to different perimeters, different routing domains may be established for applications included in the two perimeters. For example, a different default route may be established for the first perimeter (e.g., enterprise perimeter) as opposed to the default route for the second perimeter (e.g., personal perimeter). In core network router technology, a virtual private network (VPN) may include a set of router interfaces dedicated to a particular enterprise that has multiple geographically separate branch offices. Here, the interfaces may encapsulate received traffic and tunnel the encapsulated traffic through the Internet to remote branch offices, which may allow the branches to appear as though they are directly connected together. For example, in an enterprise perimeter, interfaces assigned to the enterprise may be different from interfaces assigned, for example, for personal use. In some implementations, the applications in one perimeter may be unable to see, read, or otherwise access information about networks or routing in a different perimeter. To enforce this restriction, the existing routing table may be split into multiple instances, such as the first FIB and the second FIB, so a lookup by an application in one perimeter may only operate on routing data assigned to that perimeter. In some implementations, each network routing domain may include a different set of routes and interfaces that are capable of providing network access. In addition, in some implementations, the different perimeters of a UE may have separate communication channels with physical interfaces along with separate FIBs.

In some implementations, a privileged application may be configured to access multiple security perimeters by accessing MFIBs. In these implementations, the FIB accessed in a particular situation may depend, for example, on attributes of the current user of the application. For example, a first security perimeter may be associated with engineering resources and a second security perimeter may be associated with human-resource information. In these instances, a first set of individuals (e.g., engineers) may access the first perimeter, and a second set of individuals (e.g., human-resource employees) may access the second perimeter using the same application or set of applications. In these instances, the application(s) may accesses the FIB in the first perimeter for the first set of users and the FIB in the second perimeter for the second set of users.

Figure 8:
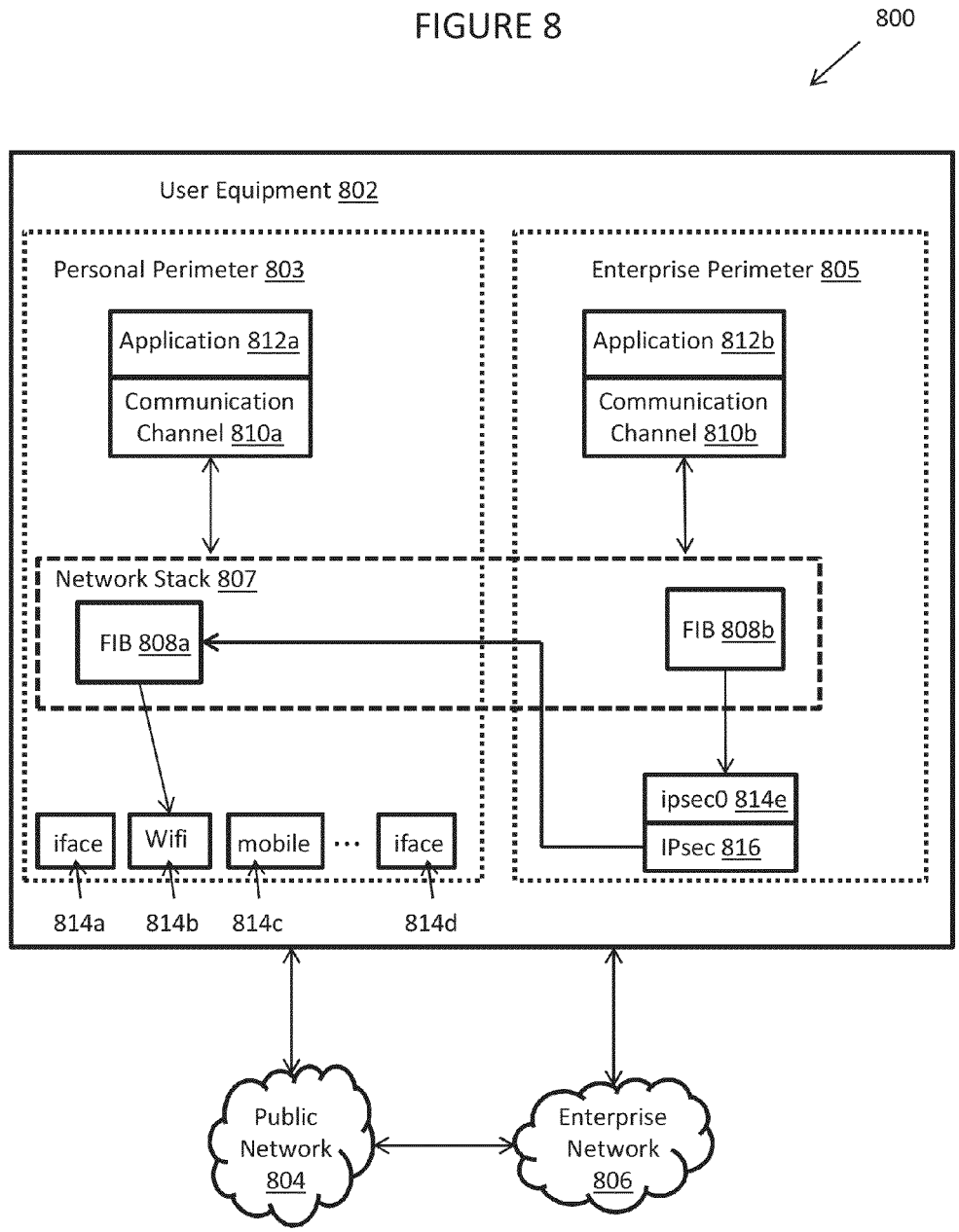
FIG. 8 is an example communication system for using a virtual private network (VPN) across perimeters.
Figure 10:
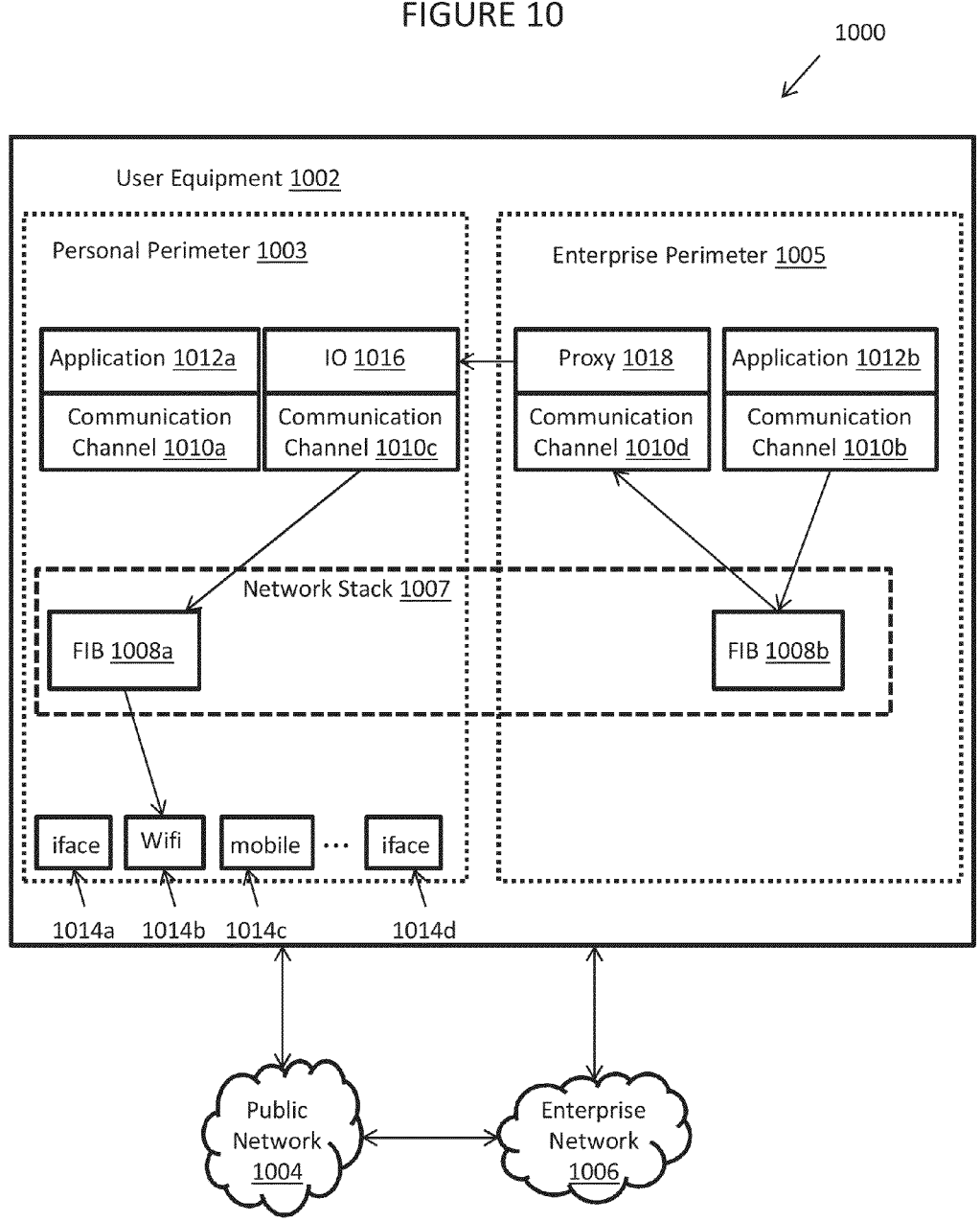
FIG. 10 is an example communication system including a FIB identifying a communication channel.

In some implementations, an application may establish a virtual private network (VPN) using a physical interface identified in a FIB assigned to a different application or perimeter (discussed in regards to FIGS. 8 and 10). For example, in MFIB implementations, a virtual interface for a VPN may bind to a physical interface (e.g., WiFi interface, cellular interface, etc.) where the virtual interface is assigned to a FIB different from a FIB for the physical interface. For example, an enterprise VPN may be established using a personal WiFi interface or a personal cellular interface. In some implementations, a virtual interface driver configured to execute Internet Protocol (IP) security (IPsec) processing for the VPN may be configured to identify the binding physical interface from a FIB other than the assigned FIB based on network data (e.g., Enterprise FIB). For example, the virtual network driver may determine that the assigned FIB identifies a different FIB and determine the physical interface. For an enterprise where a VPN is established over a personal WiFi interface or a personal cellular interface, the enterprise data may be initially processed by the IPsec interface driver or the virtual network driver (e.g., encrypted), and the post-processed data may then be routed to the binding personal WiFi interface or the personal cellular interface.

FIG. 1 is an example communication system 100 for routing communication using MFIBs in accordance with the present disclosure. In some implementations, the system 100 may use different FIBs (108a, 108b) based on communication from different applications (112a, 112b).

The exemplary communication system 100 of FIG. 1 includes user equipment (UE) 102 communicably coupled to a public network 104 and an enterprise network 106. The UE 102 comprises a network stack 107 including FIBs 108a and 108b, communication channels 110a and 110b, applications 112a and 112b, and interfaces 114a-d. The network stack 107 may receive requests to access the FIB 108a, 108b from application 112a, 112b and determine whether the application 112a, 112b is allowed access to the requested FIB 108a, 108b. If access to the requested FIB 108a, 108b is granted, the FIB 108a, 108b may provide routing information to the application 112a, 112b from which the request originated. In some implementations, the network stack 107 may merely receive a communication and determine which FIB 108a, 108b is mapped to the communication channel 110a, 110b. In the exemplary implementation of FIG. 1 communication channel 110a routes communication for application 112a based on the routing information provided by FIB 108a, and the communication channel 110b routes communication for application 112b based on the routing information provided by FIB 108b. Applications 112a and 112b may be configured to provide services to one or more users, and each of the physical interfaces 114a-d may communicate with at least one of the public network 104 or the enterprise network 106.

The UE 102 of exemplary system 100 may be a computing device operable to receive requests from the user via a user interface, such as a Graphical User Interface (GUI), a CLI (Command Line Interface), or any of numerous other user interfaces using any suitable input device (e.g. touch screen, keyboard, track wheel, etc.). Thus, where reference is made to a particular interface, it should be understood that any other user interface may be substituted in its place. In various implementations, the UE 102 comprises an electronic computing device operable to receive, transmit, process and store any appropriate data associated with the communication system 100. The UE 102 may encompass any electronic device and/or computing device that has wireless communication capability. For example, the UE 102 may be a tablet computer, a personal computer, a laptop computer, touch screen terminal, workstation, network computer, kiosk, wireless data port, wireless or wireline phone, personal data assistant (PDA), smartphone, etc. For example, the UE 102 may comprise a wireless communication device that includes an input device, such as a keypad, touch screen, mouse, or other device that can accept information, and an output device that may convey information associated with the operation of the resources, including digital data, visual information, or GUI. Both the input device and output device may include fixed or removable storage media such as a magnetic computer disk, CD-ROM, or other suitable media to both receive input from and provide output to users of terminals 106 through the display, such as a GUI. In addition, the UE 102 may also include multiple perimeters as discussed with respect to FIGS. 4-11. (See FIG. 13 and associated description for additional discussion of an example mobile communication device)

As illustrated in FIG. 1, the UE 102 may include a network stack 107 including FIBs 108a and 108b, communication channels 110a and 110b, and applications 112a and 112b. The network stack 107 may include any software, hardware, firmware, or combination thereof configured to coordinate communication with applications 112a and 112b using the FIBs 108a and 108b and the physical interfaces 114a-d. For example, the network stack 107 may verify whether a requesting application 112 has been granted permissions to access to a FIB 108 and, if so, provide the application 112 access to the FIB 108. In some implementations, the network stack 107 may manage FIBs 108a and 108b and manage connections of communication channels 110a and 110b with FIBs 108a and 108b. The FIB 108a, 108b may include any parameters, variables, policies, algorithms, instructions, settings, or rules for routing communication to at least one of the public network 104 or the enterprise network 106. For example, the FIB 108a, 108b may map a destination address to a physical interface 114, another FIB, another communication channel, or others. In general, the FIB 108a, 108b may be any data structure configured to map or otherwise associate a destination address to a physical interface 114. For example, the FIB 108a, 108b may comprise a table where each row maps a destination network address to a physical interface 114. However, the FIB 108a, 108b may be comprised of other data structures without departing from the scope of the disclosure. In some implementations, the FIB 108a, 108b may include or otherwise identify one or more of the following: destination network address (destination); address of the outgoing interface (gateway); state of the route (flag); current number of active uses for the route (refs); count of the number of packets sent using that route (use); maximum transmission unit (Mtu); physical interface (interface); or others.

The communication channel 110a, 110b can include any software, hardware, firmware or combination thereof configured to route communication from application 112a, 112b to at least one of the public network 104 or the enterprise network 106. For example, the communication channel 110a, 110b may be an IPC channel between the application and the network stack configured to determine a physical interface 114 to route communication based on the FIB 108a, 108b. In some implementations, the communication channel 110a, 110b may be one endpoint of a two-way communication link between an application 112a, 112b and an application running in the public network 104 or the enterprise network 106. For example, the communication channel 110a, 110b may be bound to a port number for a physical interface 114 so that the TCP layer can identify the application 112a, 112b to which data is destined to be sent. In some implementations, an application 112a, 112b may access the same communication channel 110a, 110b for all communications, and the communication channel 110a, 110b may switch between accessing the different FIBs 108a and 108b. The method of moving a communication channel 110a, 110b between two or more FIBs 108a/108b may be executed, for example, through an out-of-band communication between the application 112a, 112b and the network stack 107 (which controls/implements the FIBs) in which network stack 107 may verify that the application 112a, 112b is allowed to access the requested FIB 108a, 108b and modify the communication channel's association accordingly.

The applications 112a, 112b may comprise any application, program, module, process, or software that may execute, change, delete, generate, or otherwise manage information, such as business information, according to the present disclosure. For example, the application 112a, 112b may include a notification application, a contacts application, a calendar application, a messaging application, or others. Further, while illustrated as internal to the UE 102, one or more processes associated with the application 112a, 112b may be stored, referenced, or executed remotely. For example, a portion of the application 112a, 112b may be an interface to a web service that is remotely executed. Moreover, the application 112a, 112b may be a child or sub-module of another software module or enterprise application (not illustrated) without departing from the scope of this disclosure. In some implementations, the application 112a, 112b may be a hosted solution that allows multiple parties in different portions of the process to perform the respective processing. For example, the enterprise network 106 may access the application 112a, 112b on the UE 102 or as a hosted application located over network 106 without departing from the scope of this disclosure. In another example, portions of the application 112a, 112b may be used by the user working directly with the UE 102, as well as remotely via, for example, enterprise network 106. In some implementations, the applications 112a, 112b may be configured to access at least one of a personal perimeter or an enterprise perimeter (see FIGS. 3-6 for more discussion regarding perimeters). In connection with determining an interface 114, the application 112a, 112b may execute one or more of the following: determine a FIB 108a, 108b based on MFIBs assigned to the application 112a, 112b; transmit a request for access to a FIB 108a, 108b to the network stack 107; determine a physical interface 114 for the destination based on an assigned FIB 108a, 108b; determine whether an assigned FIB 108a, 108b identifies a further FIB 108a, 108b to use to identify the physical interface 114; determine the physical interface 114 to be used based on the destination of a communication and the further FIB 108a, 108b; or others.

The UE 102 may include interfaces 114a-d for communicating with other computer systems over at least one of the public network 104 or the enterprise network 106 in a client-server or other distributed environment. In certain implementations, the UE 102 receives data from internal or external senders through interfaces 114a-d for local storage, processing, or both. Generally, the interfaces 114a-d comprises logic encoded in software, hardware, firmware, or combination thereof operable to communicate with at least one of the public network 104 or the enterprise network 106. More specifically, the interfaces 114a-d may comprise software supporting one or more communications protocols associated with the public network 104 or the private network 106 or hardware operable to communicate physical signals. In the illustrated implementation, the interfaces 114a-d include a WiFi interface 114a configured to communicate with a public network 104 (e.g., Internet), a cellular interface 114b configured to communicate with a public network 104 (e.g., a cellular network), a LAN interface 114c configured to wireless communication with the enterprise network 106, and a Bluetooth interface 114d for communicating with fixed or mobile devices over short distances. The interfaces 114a-d are for illustrate purposes only, and the UE 102 may include all, some, or different interfaces without department from the scope of this disclosure.

The UE 102 may be connected to multiple networks, such as, for example, the public network 104 and the enterprise network 106. The public network 104 may, for example, be a public broadband network such as the Internet. The enterprise network 106 may, for example, be a network associated with an enterprise. The enterprise may comprise a corporate or business entity, a government body, a non-profit institution, or any other organization associated with the UE 102. For example, the enterprise may be the owner of the UE 102 or may lease the UE 102 and may hire contractors or agents who are responsible for maintaining, configuring, controlling, and/or managing the UE 102. In the illustrated implementation, the network 104, 106 may facilitate wireless and/or wireline communication with the UE 102. The network 104, 106 may communicate, for example, using Internet Protocol (IP) packets, Frame Relay frames, Asynchronous Transfer Mode (ATM) cells, voice, video, data, and other suitable information between network addresses. In addition, while the public network 104 and the enterprise network 106 are each illustrated as a single network, the network 104, 106, or both may comprise a plurality of networks. In short, the public network 104 and the enterprise network 106 may comprise any suitable network(s) configured to communicate with the UE 102.

FIG. 2 is a flow chart illustrating an example method 200 for transmitting communication based on MFIBs. While the method 200 is described with respect to FIG. 1, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 200 begins at step 202 where the network stack 107 may receive a request to access a FIB. For example, the network stack 107 may receive a request from application 112a or 112b to access an FIB 108a or 108b. At step 204, the network stack 107 may determine which FIB 108a or 108b is assigned to the requesting application 112a, 112b. While FIG. 1 illustrates two FIBs 108a and 108b, the UE 102 may include more than two FIBs without departing from the scope of the disclosure. Next, at step 208, the communication interface 114a, 114b, 114c, 114d is determined based on the assigned FIB 108a, 108b and the destination. For example, network stack 107 may determine the communication interface that maps to the destination. In some instances, the FIB 108a, 108b may be a table that identifies an interface 114 and an associated destination in the same row. The application may transmit the communication through the determined interface 114a, 114b, 114c, 114d at step 208.

Figure 3:
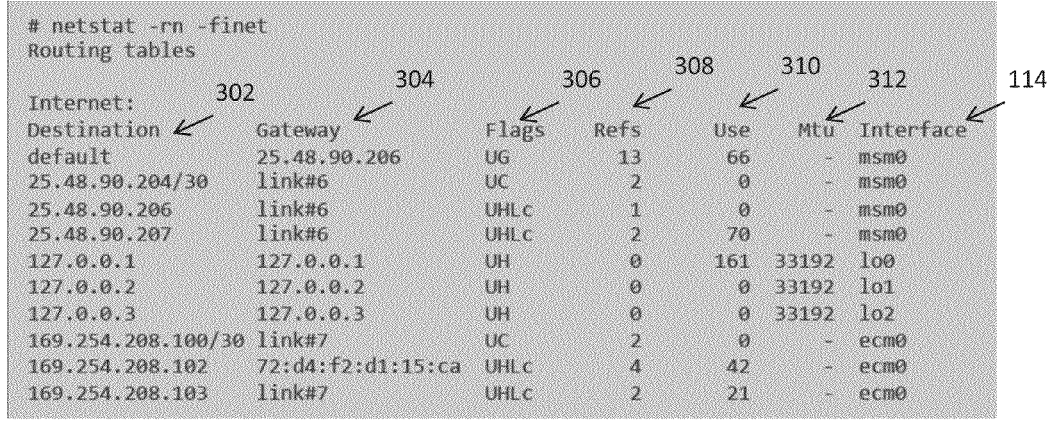
FIG. 3 is an example multiple forwarding information (FIB) of FIG. 1.

FIG. 3 illustrates an example FIB 108 of FIG. 1 in accordance with some implementations of the present disclosure. In these implementations, the FIB 108 may comprise a routing table which may include the following columns: Destination 302; Gateway 304; Flags 306; Use 308; Mtu 310; and Interface 114. The destination 302 may identify a destination network address. The gateway 304 may identify an address of the outgoing interface. The Flags 306 may identify a state of the route. The Use 308 may identify a count of the number of packets sent using that route. The Mtu 310 may identify a maximum transmission unit. The Interface 114 may identify a physical interface. In particular, the FIB 108 may map or otherwise associates a destination network address to a physical interface 114. As illustrated, in this example, the address "25.48.90.204/30" maps to the "msm0" as the physical interface. In addition to interfaces 114, the FIB 108 may map or associate a destination address to a different FIB, another communication channel 110, or other elements.

FIG. 4 is an example communication system 400 for prioritizing interfaces 414a and 414b shared between a first perimeter 403 and a second perimeter 405. For example, the interfaces 414a and 414b may be prioritized in a first order for the first perimeter 403 and prioritized in a different order for the second perimeter 405. As previously mentioned, the first perimeter 403 may substantially prevent access to perimeter resources in the second perimeter 405 by, for example, applications 412a in the first perimeter 403. Similarly, the second perimeter 405 may substantially prevent access to resources in the first perimeter 403 by, for example, applications 412b in the second perimeter 405. The first perimeter 403 includes a first FIB 408a identifying routing information, a first communication channel 410a, a first application 412a, and the shared interfaces 414a and 414b. The second perimeter 403 includes a second FIB 408b identifying routing information, a second communication channel 410b, a second application 412a, and the shared interfaces 414a and 414b. While not illustrated, the first perimeter 403, the second perimeter 405, or both may include other information or applications such as data, network access resources, applications configuration files, policies, or others without departing from the scope of the disclosure.

In some implementations, one or more of the perimeters 403, 405 may include password protection, encryption, and other process for controlling access to resources assigned to the perimeter such as the physical interfaces 414a-b. A perimeter 403, 405 may be generated by the device owner, a user, an administrator, or others. In some examples, a first perimeter 403 may be a personal perimeter created by default for the user and as well as managed by the user. In some examples, a second perimeter 405 may be an enterprise perimeter created by an administrator for an enterprise and may be managed, for example, by a remote management server. In some implementations, the first perimeter 403 may be associated with a personal account, and the second perimeter 405 may be associated with an enterprise account. The resources associated with a perimeter 403, 405 may be accessed by the device owner, a user, an administrator, a combination of the foregoing, or others. In some implementations, a perimeter 403, 405 may be associated with a single user or each user may access resources associated with multiple device perimeters such as both the personal perimeter 403 and the enterprise perimeter 405. In some implementations, a user may have access to resources in only one perimeter 403 or 405. In some implementations, a device owner may have the ability to remove individual perimeters 402 or 405 from the UE 402.

In some implementations, a FIB 408a, 408b may include a list, table, or other data structure for identifying an order prioritizing shared interfaces 414a and 414b. For example, a FIB 408a, 408b may include a list indicating an order prioritizing shared interfaces 414. In some instances, the order may be based on availability of the shared interfaces 414 such that if a first interface 414 is not available the next interface 414 in the list may be selected. In some implementations, the FIB 408a, 408b may also include additional criteria for selecting interfaces 414 from the prioritized list such as connection cost, speed, power level, user preference, reliability (e.g., a critical video conference with investors, needs to be maintained regardless of cost), system policy (e.g., company provided phone could have a policy of "never use cellular data"), or other criteria. In other words, in some situations, it is possible that the UE 402 may select a lower priority interface 414 for reasons other than unavailability of interfaces with higher priorities. For example, a list may include or otherwise identify an ordered set of policies. In these instances, the highest priority policy may be used to make a decision as to which interface is to be used in a particular situation.

In some aspects of operation, the application 412a may transmit, to the network stack 407, a request to access the FIB 408a, through the communication channel 410a. In response to the request, the network stack 407 may determine whether the application 412a should be granted access to the requested FIB 408a (e.g., permissions has previously been set for the application 412a to access the FIB 408a) and, if so, grant access to the application 412a. In the illustrated implementation, the FIB 408a may include a prioritization order for the shared interfaces 414a and 414b. In some implementations, the application 412a may select an interface 414 based on the prioritization order and possibly other criteria (e.g., costs). Based on this determination, the application 412a may transmit a communication using the selected interface 414.

Similarly, the application 412b may transmit, to the network stack 407, a request to access the FIB 408b, through the communication channel 410b. In response to the request, the network stack 407 may determine whether the application 412b should be granted access to the FIB 408b and, if so, grant access to the application 412b. In some implementations, the FIB 408b can include a prioritization order for the shared interfaces 414a and 414b different from the prioritization order defined by the FIB 408a. For example, the FIB 408a may define a prioritization order as interface 414a and then interface 414b, and the FIB 408b may define a prioritization order as interface 414b and then interface 414a. In some implementations, by using the different FIBs 408a and 408b, shared network resources may be selected differently in each security/trust domain or in each perimeter 403 and 405.

FIG. 5 is a flow chart illustrating an example method 500 for using prioritized shared interfaces. While the method 500 is described with respect to FIG. 4, this method is for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 500 begins at step 502 where the network stack 407 receives a request from an application 412 to access a FIB 408 associated with a perimeter 403 or 405. For example, the network stack 407 may receive a request from application 412a assigned to perimeter 403 or receive a request from application 412b assigned to perimeter 405. In some implementations, the network stack 407 may initially determine whether the application 412a has permission to access the FIB 408. If granted, at step 504, the network stack 407 determines an order for the shared interfaces 414a and 414b assigned to the perimeter 403 or 405. For example, the network stack 407 may identify a FIB 408a assigned to the perimeter 403 and determine, based on the FIB 408a, the order is first interface 414a and then the second interface 414b. Similarly, the network stack 407 may identify a FIB 408b assigned to the perimeter 405 and determine, based on the FIB 408b, a different order for the shared interfaces 414a and 414b. At step 506, the application 412 may determine criteria for selecting from the prioritized shared interfaces 414a and 414b, for example, from a prioritized list of policies as described above. The application 412a, 412b may select, at step 508, an interface 414a, 414b based on the criteria and the prioritized order identified in the FIB 408 and may transmit, at step 510, the communication using the selected shared interface 414a, 414b.

FIG. 6 illustrates an example communication system 600 illustrating a UE 602 communicating through a personal perimeter 603 and an enterprise perimeter 602. In this example, UE 602 may be, for example, located at a user's place of employment and may be connected directly to the enterprise network 606 using an enterprise WiFi interface 614e, and the personal application 612a may use an alternative interface such as, for example, the cellular interface 614c. In this example, the personal application 612a may transmit a request to the network stack 607 to access the FIB 608a. The network stack 607 may then verify that the application 612a has permissions to access the FIB 608a and grant access to the application 612a. In this example, the application 612a may determine the associated mobile interface 614c to be used for communication based on the assigned FIB 608a and the destination. The communication channel 610a may then transmit the communication from the personal application 612a to the public network 604 using the mobile interface 614c. In regards to the enterprise perimeter 605, the application 612b may transmit a request to the network stack 607 to access the FIB 608b. The network stack 607 may then verify that the application 612b has permission to access the FIB 608b and grant access to the application 612b. The application 612b may then determine the WiFi interface 614e is to be used for communication based on the FIB 608a and the destination. In addition, the application 612b may determine the availability of the enterprise network 606. The communication channel 610b may transmit the communication from the enterprise application 612b to the enterprise network 606 using the enterprise WiFi interface 614e.

In some implementations, the FIB 608a, FIB 608b, or both may include a list, table or other data structure that identifies a prioritized order for network type. For example, the FIB 608a, 608b may include a list prioritizing networks based on type. In these instances, the FIB 608b may identify that the enterprise network 606 has a higher priority than the public network 604. In some implementations, the FIB 608a, 608b may also include additional criteria for selecting networks from the prioritized order such as connection cost, speed, power level, user preference, reliability (e.g., a critical video conference with investors, needs to be maintained regardless of cost), system policy (e.g., company provided phone could have a policy of "never use cellular data"), or other criteria. Alternatively, the application 612b may select a network from the prioritized using the additional criteria. In other words, the network stack 607 or the application 612b may, in some implementations, select a network type with a lower priority for reasons other than unavailability of networks with higher priorities. For example, a list may include or otherwise identify an ordered set of policies. In these instances, the highest priority policy may be used to make a decision as to which interface is to be used.

FIG. 7 is a flow chart illustrating an example method 700 for prioritized network types. While the method 700 is described with respect to FIG. 6, this method is for illustration purposes only and the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 700 begins at step 702 where the network stack 607 receives a request to access a FIB 608 from application 612a or 612b. In some implementations, the network stack 607 may request communication and determine the FIB 608 assigned to the 610. In addition, the network stack 607 may determine whether the application 612a or 612b has been granted access to the identified FIB 608. At step 704, the network stack 607 determines an order for network types assigned to the application 612a or 612b. For example, the network stack 607 may identify a FIB 608a assigned to the application 612a and determine the order for network types based on the FIB 608a. Similarly, the network stack 607 may identify a FIB 608b assigned to the application 612b and determine an order for the network types based on the FIB 608b. At step 706, the application 612 may determine criteria such as a network type from the prioritized network types. In other words, the application 612 may determine that the criteria is a specific network type. The application 612a, 612b selects, at step 708, a network type and selects, at step 710, an appropriate interface 614 for the network type. At step 712, the application 612a, 612b transmits the communication using the appropriate interface 614.

FIG. 8 illustrates an example communication system 800 for establishing an enterprise VPN path from the enterprise perimeter 805 through the personal perimeter 803. In the illustrated implementation, the enterprise perimeter 805 includes the ipsec0 virtual interface 814e and an IPsec component 816. The IPsec component 816 includes any software, hardware, firmware, or combination thereof for generating a VPN tunnel through the personal perimeter 803. For example, the enterprise application 812b may use the IPsec component 816 to establish an encrypted tunnel through the WiFi interface 814b and the public network 804 to an enterprise VPN gateway. In some aspects of operation, the enterprise application 812b may transmit a request to the network stack 807 for access to the FIB 808b assigned to the enterprise perimeter 805. Alternatively, the network stack 807 may receive communication from the enterprise application 812b and determine that the FIB 808b is assigned to the communication channel 810b. In these implementations, the application 812b can determine, based on the FIB 808b, that the ipsec0 virtual interface 814e is associated with the destination identified by the request. The communication channel 810b transmits communication from the enterprise application 812b to the IPsec component 816 through the ipsec0 virtual interface 814e. The IPsec component 816 may identify the FIB 808a associated with the personal perimeter 803 and determine that the WiFi interface 814b is associated with the destination based on the FIB 808a. Prior to transmitting communications to the WiFi interface 814b, the IPsec component 814 may encrypt the communication.

Figure 9:
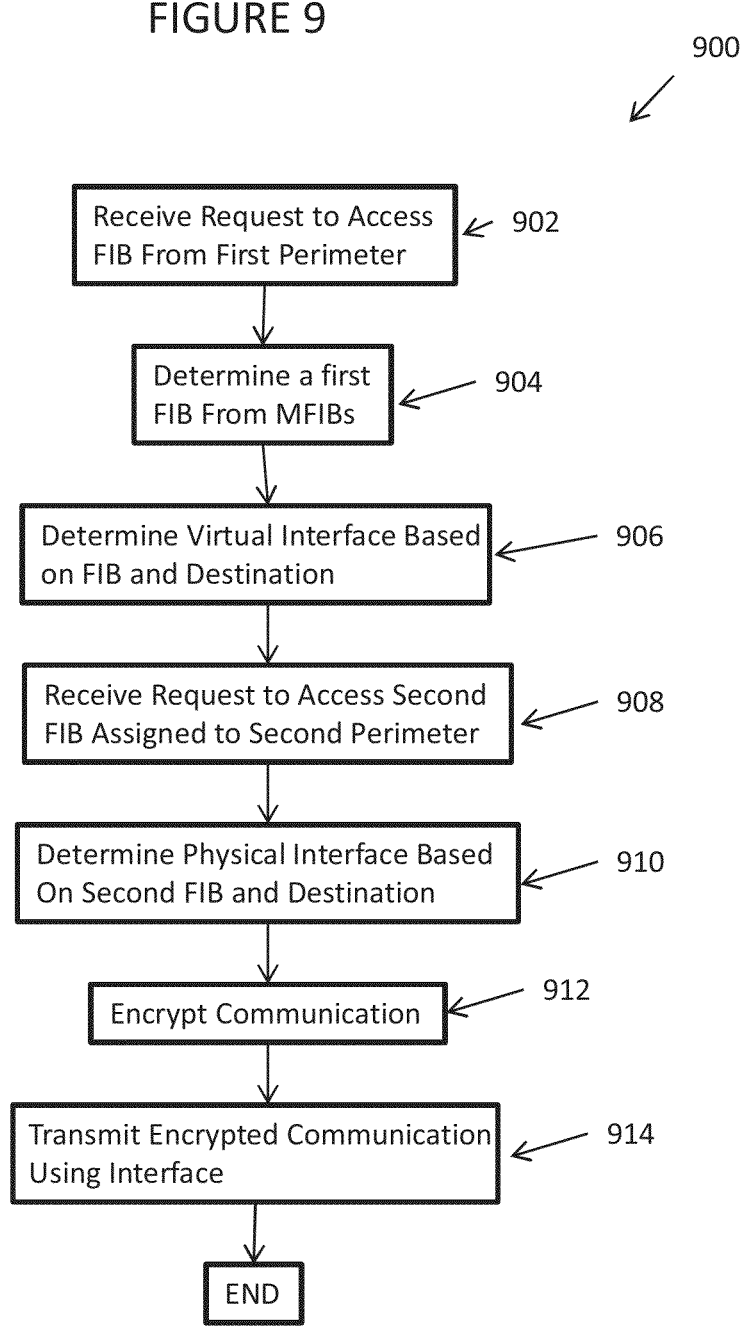
FIG. 9 is a flow chart illustrating an example method for establishing a VPN across perimeters.

FIG. 9 is a flow chart illustrating an example method 900 for establishing a VPN across perimeters. While the method 900 is described with respect to FIG. 8, this method is for illustration purposes only and the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 900 begins at step 902 where the network stack 807 may receive a request from an application 812 to access a FIB 808b associated with perimeter 805. At step 904, the network stack 807 may determine a first FIB 808b from MFIBs is assigned to the perimeter 805. Next, at step 906, the application 812b may determine a virtual interface 814e for the communication based on the FIB 808b. The network stack 807 may receive, from the IPsec component 816, a request to access the FIB 808a assigned to the perimeter 803 at step 908. The IPsec component 816 may determine, at step 910, a physical interface 814b in the perimeter 803 based on the FIB 808a and the destination. The IPsec component 816 may encrypt, at step 912, communication from the application 812b and transmits, at step 914, the encrypted communication using the interface 814b.

FIG. 10 is an example communication system 1000 for transmitting communication from an enterprise perimeter 1005 through a personal perimeter 1003. As illustrated, the personal perimeter 1003 may include a communication channel 1010c associated with an Input Output (IO) component 1016, and the enterprise perimeter 1005 may include a communication channel 1010d and a proxy component 1018. In some aspects of operation, the enterprise application 1012b may transmit a request to access the assigned FIB 1008b, which is granted once permission for the application 1012b to access the FIB 1008b is verified. The enterprise application 1012b may then determine a reference to a second communication channel 1010d based on the FIB 1008b and the destination. The communication channel 1010b may transmit the communication to the communication channel 1010d, which, in turn, may transmit the communication to the proxy component 1018. The proxy component 1018 may transmit the communication to an IO component 1016. The IO component 1016 may pass the communication to the network stack 1007, which may determine that the IO component 1016 has permission to access to the FIB 1008a assigned to the personal perimeter 1003. The IO component 1016 may determine the WiFi interface 1014b for communication based on the FIB 1008a and the destination. The communication channel 1010c may transmit the communication to the public network 1004 through the WiFi interface 1014b. In some implementations, the enterprise application 1014b may use MDS/IPPP, which may use an encrypted connection over the WiFi interface 1014b.

Figure 11:
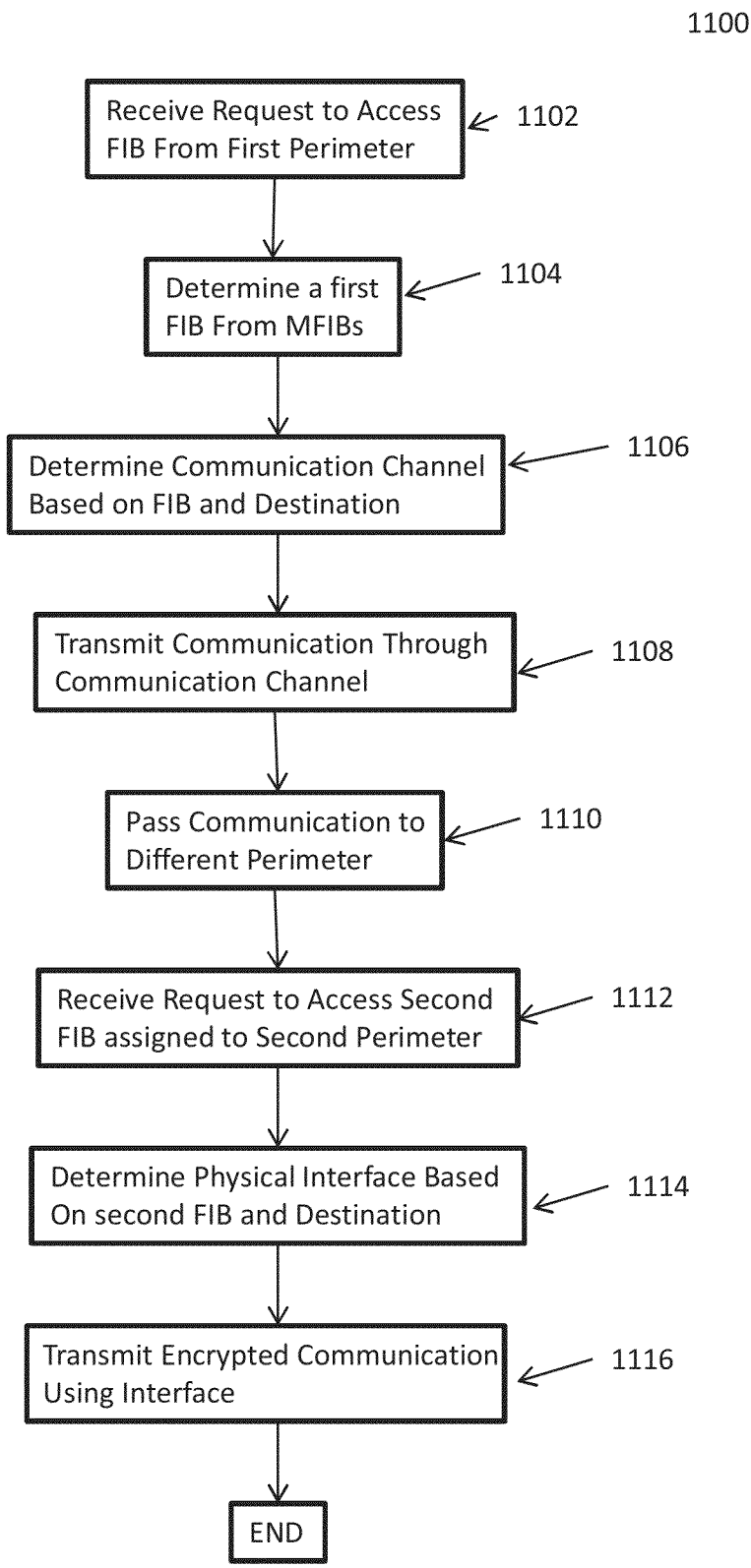
FIG. 11 is a flow chart illustrating an example method for identifying a communication channel using a FIB.

FIG. 11 is a flow chart illustrating an example method 1100 for transmitting communication across perimeters. While the method 1100 is described with respect to FIG. 10, this method is for illustration purposes only and the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

Method 1100 begins at step 1100 where the network stack 1007 receives a request to access a FIB 1008b from perimeter 1005. At step 1004, the network stack 1007 determines a first FIB 1008b from MFIBs is assigned to the perimeter 1005. Next, at step 1006, the application 1012b determines a different communication channel 1010d for the communication based on the FIB 1008b. The application 1012b transmits the communication through the communication channel 1010d at step 1108. Next, at step 1110, the proxy 1018 in the perimeter 1003 passes the communication to the IO component 1016 in the perimeter 1003. At step 1112, the network stack 1007 receives, from the IO component 1016, a request to access the FIB 1008a assigned to the perimeter 1003. The IO component 1016 determines, at step 1114, an interface 1014b in the perimeter 803 for the communication based on the FIB 1008a and the destination. The IO component 1016 transmits, at step 1116, the communication using the interface 10014b.

Figure 12:
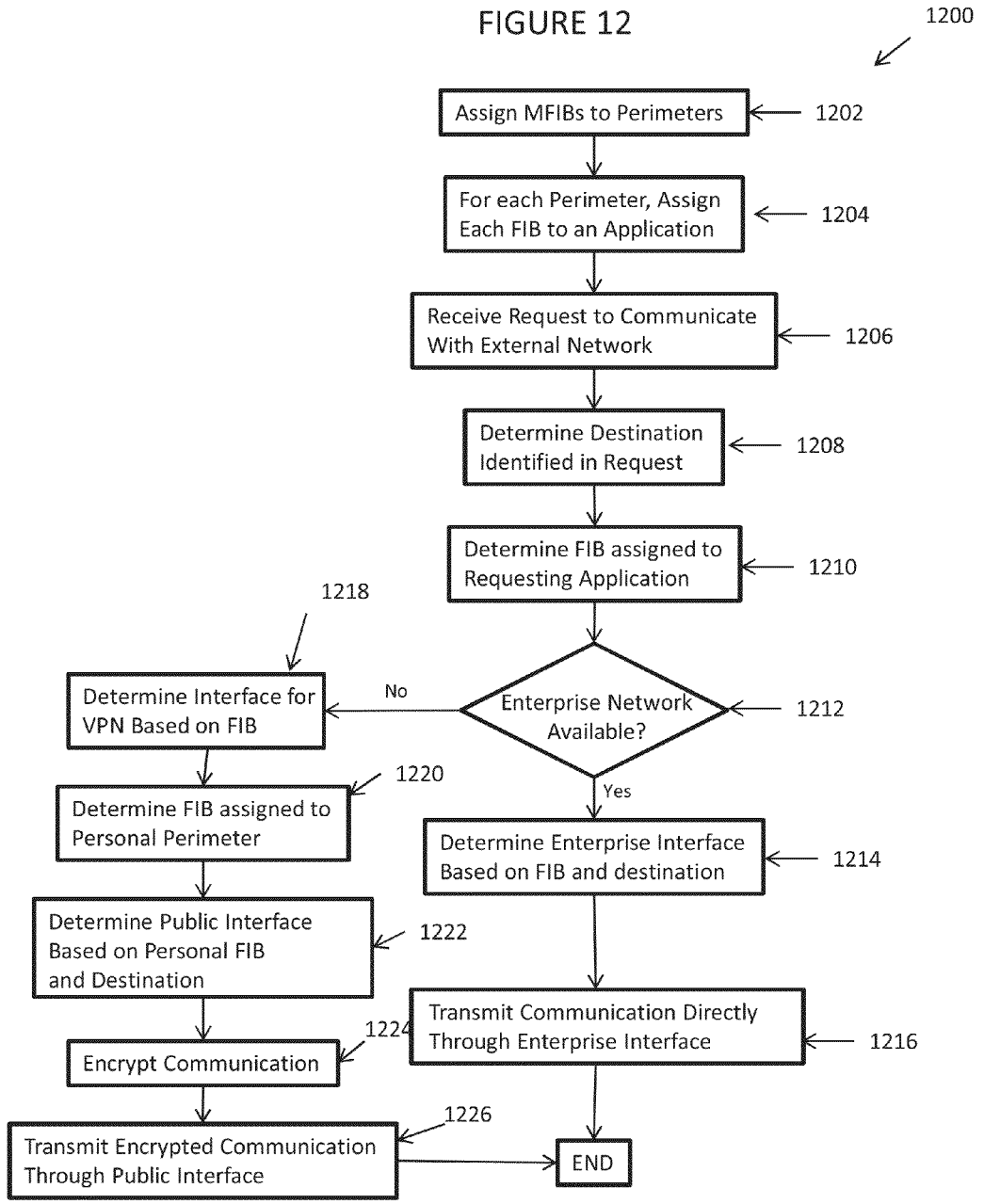
FIG. 12 is a flow chart illustrating an example method for managing MFIBs.

FIG. 12 is a flow chart illustrating an example method 1200 for managing MFIBs in multiple perimeters. These methods are for illustration purposes only and that the described or similar techniques may be performed at any appropriate time, including concurrently, individually, or in combination. In addition, many of the steps in these flowcharts may take place simultaneously and/or in different orders than as shown. Moreover, systems may use methods with additional steps, fewer steps, and/or different steps, so long as the methods remain appropriate.

At a high level, the method 1200 includes two processes: (1) assigning different FIBs to different applications from step 1202 to 1204; and (2) routing communication using MFIBs from step 1206 to 1226. As for the assigning process, the MFIBs are assigned to perimeters at step 1202. For example, with the UE 402 illustrated in FIG. 4, the UE 402 may, for example, be used to assign a first FIB 408a to a personal perimeter 403 and a second FIB 408b to an enterprise perimeter 405. In some implementations, the personal perimeter may be assigned multiple FIBs or the enterprise perimeter 405 may be assigned multiple FIBs or both. At step 1204, the FIBs in each perimeter are assigned one or more applications. In the example, the FIB 408a may be assigned to the personal application 412a, and the FIB 408b may be assigned to the enterprise application 412b. In the implementations with multiple FIBs in a perimeter, each FIB may be assigned to different application in the perimeter. Turning to the routing processes, a request for communication with an external network is received at step 1206. As for the example, the application 412b may receive a request to transmit communication to the enterprise network 406. At step 1208, a destination for the communication may be determined. Again returning to the example, the network stack 407 may determine a destination address for the communication based on the request. Next, at step 1210, the FIB assigned to the requesting application is determined by the network stack 407. In the example, the network stack 407 may determine that FIB 408b is assigned to the application 412b. In the MFIBs in a single perimeter example, the network stack 407 may determine an assigned FIB from a plurality of FIBs assigned to the perimeter. If the network stack 407 determines that the enterprise network is available at decisional step 1212, then, at step 1212, the network stack 407 determines the enterprise interface based on the FIB and the destination. Again in the example, the network stack 407 may determine that the enterprise network 406 is available and determine the enterprise interface 414c is to be used for the communication based on the FIB 408b and the destination address. Returning to decisional step 1212, if the enterprise network is not available, an interface for a VPN is determined at step 1218. For example, the network stack 607 in FIG. 6 may determine the ipsec0 virtual interface 614e for the communication if the enterprise network 606 is not available. At step 1220, a FIB assigned to the personal perimeter is determined. As for the example, the IPsec component 814 may determine the FIB 808*a* in the personal perimeter 803 for routing the communication. Next, at step 1222, a public interface for the communication is determined based on the personal FIB and the destination address. Again in the example, the IPsec component 814 may determine WiFi interface 814*b* for routing based on the personal FIB 808*a* and the destination address. The communication may be encrypted at step 1224. As for the example, the IPsec component 814 may encrypt the communication. At step 1226, the encrypted communication may be transmitted through a public interface. Returning to the example, the IPsec component 814 may transmit the encrypted communication to the enterprise network 806 through the WiFi interface 814*b*.

Figure 13:
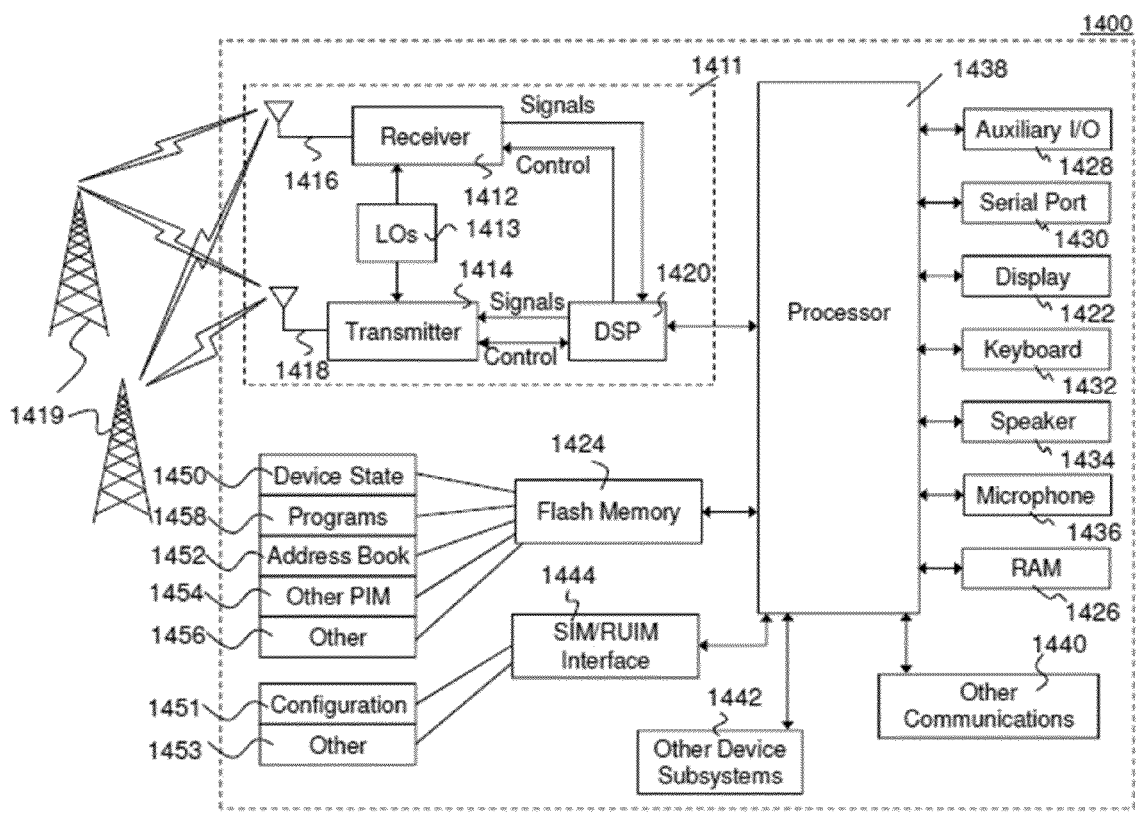
FIG. 13 illustrates an example mobile device.

The devices discussed in regards to FIG. 1-12 may be a mobile device. One such example mobile device is illustrated below with reference to FIG. 13. The mobile device of FIG. 13 is however not meant to be limiting and other mobile devices could also be used.

Mobile device 1400 may comprise a two-way wireless communication device having any of voice capabilities, data communication capabilities, or both. Mobile device 1400 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a tablet, or a data communication device, as examples.

Where mobile device 1400 is enabled for two-way communication, it may incorporate a communication subsystem 1411, including both a receiver 1412 and a transmitter 1414, as well as associated components such as one or more antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the device is intended to operate.

Network access requirements will also vary depending upon the type of network 1419. In some networks, network access is associated with a subscriber or user of mobile device 1400. A mobile device may require a removable user identity module (RUIM) or a subscriber identity module (SIM) card in order to operate on the network. The SIM/RUIM interface 1444 may be similar to a card-slot into which a SIM/RUIM card can be inserted and ejected like a diskette or PCMCIA card. The SIM/RUIM card can have memory and hold many key configuration 1451, and other information 1453 such as identification, and subscriber related information.

When required network registration or activation procedures have been completed, mobile device 1400 may send and receive communication signals over the network 1419. As illustrated in FIG. 13, network 1419 can consist of multiple base stations communicating with the mobile device. For example, in a hybrid CDMA 1x EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 1416 through communication network 1419 are input to receiver 1412, which may perform such common receiver functions as signal amplification, frequency down conversion, filtering, channel selection and the like, and in the example system shown in FIG. 13, analog to digital (A/D) conversion. A/D conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog conversion, frequency up conversion, filtering, amplification and transmission over the communication network 1419 via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

Mobile device 1400 generally includes a processor 1438 which controls the overall operation of the device. Communication functions, including data and voice communications, are performed through communication subsystem 1411. Processor 1438 also interacts with further device subsystems such as the display 1422, flash memory 1424, random access memory (RAM) 1426, auxiliary input/output (I/O) subsystems 1428, serial port 1430, one or more keyboards or keypads 1432, speaker 1434, microphone 1436, other communication subsystem 1440 such as a short-range communications subsystem and any other device subsystems generally designated as 1442. Serial port 1430 could include a USB port or other port known to those in the art having the benefit of the present disclosure.

Some of the subsystems shown in FIG. 13 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list, among other applications.

Operating system software used by the processor 1438 may be stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. The applications may be segregated based on the mode or category they fall into. Memory 1424 may further provide security for corporate data and if some applications are locked while others are not.

Processor 1438, in addition to its operating system functions, may enable execution of software applications on the mobile device. A predetermined set of applications that control basic operations, including data or voice communication applications for example, as well as a predetermined set of certificates, will normally be installed on mobile device 1400 during manufacturing. Other applications could be installed subsequently or dynamically.

Applications and software, such as those described above may be stored on any computer readable storage medium. The computer readable storage medium may be a tangible or intransitory/non-transitory medium such as optical (e.g., CD, DVD, etc.), magnetic (e.g., tape) or other memory known in the art.

One example software application may be a personal information manager (PIM) application having the ability to organize and manage data items relating to the user of the mobile device such as, but not limited to, e-mail, calendar events, voice mails, appointments, and task items. Further applications, including, but not limited to, a media player, camera, messenger, mail, calendar, address book, web browser, social networking, game, electronic book reader, map, or other application may also be loaded onto the mobile device 1400 through the network 1419, an auxiliary I/O subsystem 1428, serial port 1430, short-range communications subsystem 1440 or any other suitable subsystem 1442, and installed by a user in the RAM 1426 or a non-volatile store (not shown) for execution by the processor 1438. Such flexibility in application installation increases the functionality of the device and may provide enhanced on-device functions, communication-related functions, or both. For example, secure communication applications may enable electronic commerce functions and other such financial transactions to be performed using the mobile device 1400.

In a data communication mode, a received signal such as a text message or web page download will be processed by the communication subsystem 1411 and input to the processor 1438, which may further process the received signal for output to the display 1422, or alternatively to an auxiliary I/O device 1428.

A user of mobile device 1400 may also compose data items such as email messages for example, using a keyboard 1432, which may comprise a virtual or physical keyboard or both, and may include a complete alphanumeric keyboard or telephone-type keypad, among others, in conjunction with the display 1422 and possibly an auxiliary I/O device 1428. Such composed items may then be transmitted over a communication network through the communication subsystem 1411.

For voice communications, overall operation of mobile device 1400 is similar, except that received signals would typically be output to one or more speakers 1434 and signals for transmission would be generated by a microphone 1436. Alternative voice or audio I/O subsystems, such as a voice message recording subsystem, may also be implemented on mobile device 1400. Although voice or audio signal output may be accomplished primarily through the one or more speakers 1434, display 1422 may also be used to provide an indication of the identity of a calling party, the duration of a voice call, or other voice call related information for example.

Serial port 1430 in FIG. 13 would normally be implemented in a personal digital assistant (PDA)-type mobile device for which synchronization with a user's desktop computer (not shown) may be desirable, but is an optional device component. Such a port 1430 would enable a user to set preferences through an external device or software application and would extend the capabilities of mobile device 1400 by providing for information or software downloads to mobile device 1400 other than through a wireless communication network. The alternate download path may for example be used to load an encryption key onto the device through a direct and thus reliable and trusted connection to thereby enable secure device communication. As will be appreciated by those skilled in the art, serial port 1430 can further be used to connect the mobile device to a computer to act as a modem.

Other communications subsystems 1440, such as a short-range communications subsystem, are further optional components which may provide for communication between mobile device 1400 and different systems or devices, which need not necessarily be similar devices. For example, the subsystem 1440 may include an infrared device and associated circuits and components, near field communications (NFC) or a Bluetooth™ communication module to provide for communication with similarly enabled systems and devices.

A number of implementations of the invention have been described. Nevertheless, it will be understood that various modifications may be made without departing from the spirit and scope of the invention. Accordingly, other implementations are within the scope of the following claims.

What is claimed is:

1. A method for routing a communication, comprising:
receiving, from an application running on a user equipment (UE), a request to access a forwarding information base (FIB), the UE including a plurality of FIBs and a plurality of communication interfaces, each of the plurality of FIBs including communication interface information;
determining an assigned FIB from the plurality of FIBs, the assigned FIB having been assigned to the application;
determining an appropriate communication interface from the plurality of communication interfaces of the UE for communication based on a destination of the communication and the communication interface information of the assigned FIB;
transmitting the communication to the destination using the appropriate communication interface; and
wherein the FIB comprises a first FIB, the application comprises a first application, and determining an interface for the communication comprises:
determining the first FIB identifies a second FIB from the plurality of FIBs, wherein the second FIB is assigned to a second application;
determining the interface based on the second FIB and the destination; and
transmitting the communication through an encrypted tunnel using the interface identified in the second FIB.

2. The method of claim 1, the method further comprising:
assigning the first FIB to a first set of applications including the application; and
assigning a second FIB from the plurality of FIBs to a second set of applications, wherein the second FIB is different from the first FIB.

3. The method of claim 1, the method further comprising:
assigning a first default route to the first application using the first FIB; and
assigning a second default route to a second application using a second FIB from the plurality of FIBs, wherein the second default route is different from the first default route.

4. The method of claim 1, wherein a first perimeter includes the assigned FIB and is configured to prevent resources in a second perimeter from accessing one or more first network resources in the first perimeter.

5. The method of claim 4, wherein the first perimeter and the second perimeter include shared interfaces and determining an interface comprises:
determining a first prioritized order for the shared interfaces in the first perimeter based on a first FIB, wherein a second prioritized order in a second FIB is different from the first prioritized order; and
determining the interface from the shared interfaces based on the prioritized order and the destination.

6. The method of claim 4, wherein determining an interface comprises:
   determining a first prioritized order for network types in the first perimeter based on a first FIB;
   selecting a network type based on the first prioritized order for the network types; and
   determining the interface based on the destination and the selected network type.

7. The method of claim 1, wherein the first application comprises an enterprise application, and the interface identified in the second FIB comprises an interface to a public network.

8. The method of claim 1, wherein the FIB comprises a first FIB and a network stack determines the application is assigned the first FIB and is configured to access at least the first FIB and a second FIB from the plurality of FIBs.

9. A computer program product for routing a communication encoded on a tangible, non-transitory storage medium, the product comprising computer readable instructions for causing one or more processors to perform operations comprising:
   receiving, from an application running on a user equipment (UE), a request to access a forwarding information base (FIB), the UE including a plurality of FIBs and a plurality of communication interfaces, each of the plurality of FIBs including communication interface information;
   determining an assigned FIB from the plurality of FIBs, the assigned FIB having been assigned to the application;
   determining an appropriate communication interface from the plurality of communication interfaces of the UE for communication based on a destination of the communication and the communication interface information of the assigned FIB;
   transmitting the communication to the destination using the appropriate communication interface; and
   wherein the FIB comprises a first FIB, the application comprises a first application, and determining an interface for the communication comprises:
      determining the first FIB identifies a second FIB from the plurality of FIBs, wherein the second FIB is assigned to a second application;
      determining the interface based on the second FIB and the destination; and
      transmitting the communication through an encrypted tunnel using the interface identified in the second FIB.

10. The computer program product of claim 9, the instructions further comprising:
   assigning the first FIB to a first set of applications including the application; and
   assigning a second FIB from the plurality of FIBs to a second set of applications, wherein the second FIB is different from the first FIB.

11. The computer program product of claim 9, the instructions further comprising:
   assigning a first default route to the first application using the first FIB; and
   assigning a second default route to a second application using a second FIB from the plurality of FIBs, wherein the second default route is different from the first default route.

12. The computer program product of claim 9, wherein a first perimeter includes the FIB and is configured to prevent resources in a second perimeter from accessing one or more first network resources in the first perimeter.

13. The computer program product of claim 12, wherein the first perimeter and the second perimeter include shared interfaces and the instructions comprising determining an interface comprises the instructions comprising:
   determining a first prioritized order for the shared interfaces in the first perimeter based on a first FIB, wherein a second prioritized order in a second FIB is different from the first prioritized order; and
   determining the interface from the shared interfaces based on the prioritized order and the identified destination.

14. The computer program product of claim 12, wherein the instructions comprising determining an interface comprises the instructions comprising:
   determining a first prioritized order for network types in the first perimeter based on the first FIB;
   selecting a network type based on the first prioritized order for the network types; and
   determining the interface based on the destination and the selected network type.

15. The computer program product of claim 9, wherein the first application comprises an enterprise application, and the interface identified in the second FIB comprises an interface to a public network.

16. The computer program product of claim 9, wherein the FIB comprises a first FIB, and a network layer determines the application is assigned the first FIB and is configured to access at least the first FIB and a second FIB from the multiple forwarding information bases (MFIBs).

17. User equipment (UE) for routing a communication, comprising:
   memory that stores a plurality of FIBs including a FIB and an application, wherein each FIB in the plurality of FIBs identifies routes and interfaces for communicating messages; and
   one or more processors configured to:
      receive, from an application running on a user equipment (UE), a request to access a forwarding information base (FIB), the UE including a plurality of FIBs and a plurality of communication interfaces, each of the plurality of FIBs including communication interface information;
      determine an assigned FIB from the plurality of FIBs, the assigned FIB having been assigned to the application;
      determine an appropriate communication interface from the plurality of communication interfaces of the UE for communication based on a destination of the communication and the communication interface information of the assigned FIB;
      transmit the communication to the destination using the appropriate communication interface; and
      wherein the FIB comprises a first FIB, the application comprises a first application, and determine an interface for the communication comprises:
         determine the first FIB identifies a second FIB from the plurality of FIBs, wherein the second FIB is assigned to a second application;
         determine the interface based on the second FIB and the destination; and
         transmit the communication through an encrypted tunnel using the interface identified in the second FIB.

18. The UE of claim 17, the processors further configured to:
   assign the first FIB to a first set of applications including the application; and
   assign a second FIB from the multiple forwarding information bases (MFIBs) to a second set of applications, wherein the second FIB is different from the first FIB.

19. The UE of claim 17, the processors further configured to:
assign a first default route to the first application using the first FIB; and
assign a second default route to a second application using a second FIB from the multiple forwarding information bases (MFIBs), wherein the second default route is different from the first default route.

20. The UE of claim 17, wherein a first perimeter includes the FIB and is configured to prevent resources in a second perimeter from accessing one or more first network resources in the first perimeter.

21. The UE of claim 20, wherein the first perimeter and the second perimeter include shared interfaces and the processors configure to determine an interface comprises the processors configured to:
determine a first prioritized order for the shared interfaces in the first perimeter based on a first FIB, wherein a second prioritized order in a second FIB is different from the first prioritized order; and
determine the interface from the shared interfaces based on the prioritized order and the identified destination.

22. The UE of claim 20, wherein the processors configured to determine an interface comprises the processors configured to:
determine a first prioritized order for network types in the first perimeter based on the first FIB;
select a network type based on the first prioritized order for the network types; and
determine the interface based on the destination and the selected network type.

23. The UE of claim 17, wherein the first application comprises an enterprise application, and the interface identified in the second FIB comprises an interface to a public network.

24. The UE of claim 17, wherein the FIB comprises a first FIB, and a network layer determines the application is assigned the first FIB and is configured to access at least the first FIB and a second FIB from the MFIBs.

* * * * *